United States Patent
Pashley et al.

(10) Patent No.: US 11,472,723 B2
(45) Date of Patent: Oct. 18, 2022

(54) METHOD FOR REMOVING HEAVY METALS FROM AN AQUEOUS SOLUTION

(71) Applicant: NEWSOUTH INNOVATIONS PTY LIMITED, Sydney (AU)

(72) Inventors: Richard Mark Pashley, Australian Capital Territory (AU); Abul Fazal Mohammed Mokhlesur Rahman, Australian Capital Territory (AU); Fatemeh Makavipour, Australian Capital Territory (AU); Mojtaba Taseidifar, Australian Capital Territory (AU)

(73) Assignee: NewSouth Innovations Pty Limited, Sydney (AU)

( * ) Notice: Subject to any disclaimer, the term of this patent is extended or adjusted under 35 U.S.C. 154(b) by 32 days.

(21) Appl. No.: 16/343,233

(22) PCT Filed: Oct. 20, 2017

(86) PCT No.: PCT/AU2017/051145
§ 371 (c)(1),
(2) Date: Apr. 18, 2019

(87) PCT Pub. No.: WO2018/071985
PCT Pub. Date: Apr. 26, 2018

(65) Prior Publication Data
US 2019/0248682 A1     Aug. 15, 2019

(30) Foreign Application Priority Data

Oct. 20, 2016  (AU) ................ 2016904251

(51) Int. Cl.
*C02F 1/24*     (2006.01)
*C02F 1/62*     (2006.01)
(Continued)

(52) U.S. Cl.
CPC ............. *C02F 1/62* (2013.01); *B01D 21/02* (2013.01); *B03D 1/012* (2013.01); *C02F 1/24* (2013.01); *C02F 2101/20* (2013.01)

(58) Field of Classification Search
CPC .......... C02F 1/24; C02F 1/62; C02F 2101/20; B03D 1/012; B01D 21/02
(Continued)

(56) References Cited

U.S. PATENT DOCUMENTS 3,755,158 A * 8/1973 Inazuka ............... C02F 1/5236
                                            210/725
4,186,087 A * 1/1980 Kato ...................... B03D 1/26
                                            210/221.2

(Continued)

FOREIGN PATENT DOCUMENTS

DE    2230594        1/1973
GB    1321810 A      7/1973
(Continued)

OTHER PUBLICATIONS

EP Extended Search Report dated Jun. 17, 2020 in corresponding EP Application No. 17861750.2.
(Continued)

*Primary Examiner* — Thomas M Lithgow
(74) *Attorney, Agent, or Firm* — Myers Bigel, P.A.

(57) ABSTRACT

The invention provides a method for removing a dissolved heavy metal from an aqueous solution. The method comprises dissolving in the aqueous solution a foaming agent of formula (I) or a salt thereof. The method further comprises passing a gas through the aqueous solution to form a foam and separating the foam from the aqueous solution.

(Continued)

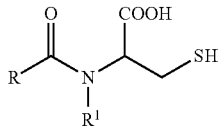

(I)

13 Claims, 6 Drawing Sheets

(51) Int. Cl.
  *B03D 1/012* (2006.01)
  *B01D 21/02* (2006.01)
  *C02F 101/20* (2006.01)
(58) Field of Classification Search
  USPC .......................................................... 210/705
  See application file for complete search history.

(56) References Cited

U.S. PATENT DOCUMENTS

| | | | | |
|---|---|---|---|---|
| 4,464,343 | A | * | 8/1984 | Hitchcock ............. B01D 59/00 210/638 |
| 4,790,932 | A | | 12/1988 | Kottwitz et al. |
| 2009/0065736 | A1 | | 3/2009 | Johnson et al. |

FOREIGN PATENT DOCUMENTS

| WO | 9851646 A1 | 11/1998 |
|---|---|---|
| WO | 9861646 A1 | 11/1998 |
| WO | 2005013927 A1 | 2/2005 |
| WO | 2007/149587 A2 | 12/2007 |
| WO | 2007149587 A2 | 12/2007 |

OTHER PUBLICATIONS

F. Makavipour, R.M. Pashley, "A study of ion adsorption onto surface functionalized silica particles," Chem. Eng. J., 262 (2015) 119-24.
H. Fan, F. Han, Z. Liu, L. Qin, Z. Li, D. Liang, F. Ke, J. Huang, H. Fu, "Active control of surface properties and aggregation behavior in amino acid-based Gemini surfactant systems," J. Colloid Interface Sci., 321 (2008) 227-34.
C.M.C. Faustino et al, "New Urea-Based Surfactants Derived from α,ω-Amino Acids," The Journal of Physical Chemistry B, 113 (2009) 977-82.
P. Heitmann, "A Model for Sulfhydryl Groups in Proteins. Hydrophobic Interactions of the Cysteine Side Chain in Micelles," Eur. J. Biochem., 3 (1968) 346-50.
C.M.C. Faustino, A.R.T. Calado, L. Garcia-Rio, Mixed micelle formation between amino acid-based surfactants and phospholipids, J. Colloid Interface Sci., 359 (2011) 493-98.
Faustino et al., 'Dimeric and monomeric surfactants derived from sulfur-containing amino acids', Journal of Colloid and Interface Science, 351 (2010), pp. 472-477.
International Search Report and Written Opinion received in PCT International Application No. PCT/AU2017/051145, dated Nov. 22, 2017.
Bordes et al., "Amino acid-based surfactants—do they deserve more attention?", Advances in Colloid and Interface Science; vol. 222, pp. 79-91 (2015).
Nazari, A.M.; "Heavy metal from diluted solution using cysteine-rich protein-coated air bubbles"; Thesis; Nov. 2014.
Tolani, S. et al., "Rapid and Efficient Removal of Heavy Metal Ions from Aqueous Media Using Cysteine-Modified Polymer Nanowires", Journal of Applied Polymer Science, vol. 116, pp. 308-313 (2010).
T. Yoshimura, et al, "Adsorption and aggregation properties of amino acid-based N-alkyl cysteine monomeric and -dialkyl cystine gemini surfactants," J. Colloid Interface Sci., 308 (2007) 466-73.
Examination Report received in Indian Application No. 201927019714.
"Office Action corresponding to Korean Application No. 520060118328 dated May 23, 2022".

\* cited by examiner

METHOD FOR REMOVING HEAVY METALS FROM AN AQUEOUS SOLUTION

This application claims priority from Australian provisional patent application no. 2016904251 filed on 20 Oct. 2016, the contents of which are incorporated herein by reference.

TECHNICAL FIELD

The present invention relates to a method for removing dissolved heavy metals from an aqueous solution.

BACKGROUND

Some heavy metal ions, such as ions of arsenic, mercury or lead, can have adverse effects on biological systems. The presence of such heavy metal ions in drinking water can cause adverse effects to the health of a human or animal which consumes the water.

Arsenic is a trace element which can be found in the earth's crust with an abundance of 54, and an average concentration of about 5 ppm. Some processes, such as mining, well-drilling and weathering, may increase the amount of this heavy metal released into the environment, especially into groundwater. This increased presence of arsenic in the environment poses a significant risk to public health in the form of an increased risk of cancer (mostly bladder, lung and skin cancers) and other diseases. Groundwater contamination can also lead to contamination of agricultural products, for example, rice. Inorganic forms of arsenic which are toxic include As (V) and As (III). As (V) exists predominantly under oxidizing conditions as arsenate ($H_2AsO_4^-$ and $HAsO_4^{2-}$). As (III) exists naturally as arsenite ($H_3AsO_3$), predominantly under reducing conditions in a pH range of 2-9. The World Health Organization (WHO) has stipulated a maximum contaminant level (MCL) for arsenic of 0.01 mg/L in drinking water.

Mercury is a volatile heavy metal that has caused public health and environmental concern because of its toxic, persistent, and bio-accumulative properties. Recently, mercury contamination has increased considerably, as it is or has been used in various industrial processes and products. Mercury emissions from human activities are about 30-55% of global atmospheric mercury emissions. Mercury can cause severe neurological and renal disturbances. Short-term or long-term exposure to mercury (inhalation, ingestion or dermal) can have toxic effects on the body, mainly the kidneys. Elemental (or metallic) mercury, inorganic mercury (to which people may be exposed through their occupation) and organic mercury (e.g., methylmercury, to which people may be exposed through their diet) may result in different degrees of toxicity and effects on the nervous, digestive and immune systems, and on lungs, kidneys, skin and eyes. WHO listed mercury as one of the top ten chemicals or groups of chemicals of major public health concern. The MCL of inorganic mercury is reported as 0.002 mg/L in drinking water by the United States Environmental Protection Agency (EPA). Erosion of natural deposits, discharge from refineries and factories and runoff from landfills and cropland are the main reported sources for inorganic mercury in drinking water.

Lead is a cumulative, toxic, heavy metal, and can affect multiple body systems. Lead is particularly harmful to young children. In the body, lead is distributed to the brain, liver, kidney and bones and can be stored in the teeth and bones, where it accumulates over time. The MCL reported by the EPA for lead in drinking water is 0.015 mg/L. Long-term exposure above the MCL could result in delays in physical or mental development in infants and children; slight deficits in attention span and learning abilities are other common symptoms. In adults, kidney problems and high blood pressure could be the results. According to the Joint FAO/WHO Expert Committee on Food Additives (JECFA) reports, the exposure to lead has shown a wide range of effects, such as various neurological and behavioural effects, mortality (mainly due to cardiovascular diseases), impaired renal function, hypertension, impaired fertility and adverse pregnancy outcomes, delayed sexual maturation and impaired dental health.

Lead is used in the production of lead acid batteries, solder, alloys, cable sheathing, pigments, rust inhibitors, ammunition, glazes and plastic stabilizers and may be released into the environment from these products. Corrosion of household plumbing systems and erosion of natural deposits are also known sources of this contaminant in drinking water.

A range of technologies have been developed for the removal of high concentrations of arsenic or other heavy metals from drinking water, including oxidation, coagulation, precipitation, adsorption, adsorbing floc flotation, ion-exchange and membrane techniques. Many of these techniques are costly and/or energy-intensive. Other approaches for the removal of high concentrations of arsenic from drinking water include phytoremediation or the use of bacteria, which can play an important role in facilitating biological arsenic removal processes.

It would be advantageous to provide an alternative method for removing dissolved heavy metals from drinking water and other aqueous solutions. It would also be advantageous to provide such a method which can be used to remove dissolved heavy metals from dilute aqueous solutions comprising less than 10 ppm of the dissolved heavy metal.

SUMMARY OF THE INVENTION

In a first aspect, the present invention provides a method for removing a dissolved heavy metal from an aqueous solution, the method comprising dissolving in the aqueous solution a foaming agent of formula (I):

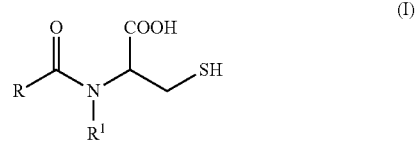

or a salt thereof, wherein R represents a hydrophobic group; and
$R^1$ represents a hydrogen or methyl group.

Typically the method further comprises passing a gas through the aqueous solution to form a foam, and separating the foam from the aqueous solution.

In one embodiment, R represents an aliphatic hydrophobic group.

In one embodiment, R represents a linear or branched $C_5$-$C_{10}$ alkyl.

In one embodiment, R represents a linear or branched $C_7$-$C_9$ alkyl.

In one embodiment, R represents —$(CH_2)_6CH_3$ and $R_1$ represents H.

In one embodiment, the foaming agent of formula (I) or salt thereof has a solubility of greater than 0.0001 M in water.

In one embodiment, the CMC of the foaming agent of formula (I) or salt thereof in the aqueous solution is greater than 0.0001 M.

In one embodiment, the foaming agent is in the form of a salt.

In one embodiment, the salt is a Na, K, Li or Cs salt.

In one embodiment, the concentration of the foaming agent of formula (I) or salt thereof in the aqueous solution is from about 0.01 mM to about 0.02 M.

In one embodiment, the concentration of the foaming agent of formula (I) or salt thereof in the aqueous solution is from about 0.0001 M to about 0.02 M.

In one embodiment, the pH of the aqueous solution is in the range of from about 8 to about 9.

In one embodiment, the heavy metal is selected from the group consisting of As, Hg, Pb, Cd, Ni, Co, Cr, Zn and Cu. In some embodiments, the heavy metal is present in the solution as the metal cation. In some embodiments, the heavy metal is present in the solution as an oxyanion of the heavy metal (e.g. an oxyanion of As(V)).

In one embodiment, the gas is selected from the group consisting of dry air, humidified air, carbon dioxide, nitrogen, helium, argon and oxygen.

BRIEF DESCRIPTION OF THE FIGURES

The invention will be further described, by way of example only, with reference to the accompanying drawings, in which.

DESCRIPTION OF THE INVENTION

Figure 1:
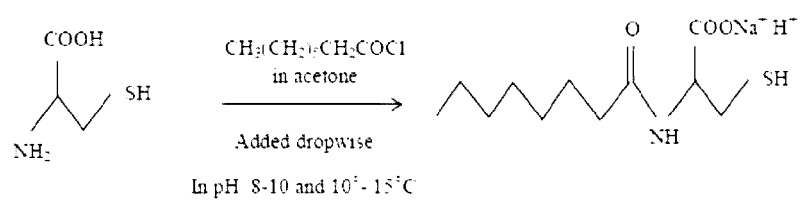
FIG. 1 is a scheme showing the synthesis of octanoyl-cysteine.

The inventors have developed a method that can be used to remove a dissolved heavy metal, such as arsenic, mercury and lead, from an aqueous solution. The method of the invention removes at least some of the dissolved heavy metal from the aqueous solution, thus reducing the concentration of the dissolved heavy metal in the solution.

As used herein, the term "heavy metal" refers to a metal having an atomic weight greater than 40, but excluding s- and f-block metals (i.e. excluding metals in Groups 1 and 2 of the periodic table and excluding the lanthanides and the actinides), in other words, a "heavy metal" is a d- or p-block metal having an atomic weight greater than 40. Examples of heavy metals include As, Hg, Pb, Cd, Ni, Co, Cr, Zn and Cu. The method of the invention may advantageously be used to remove dissolved toxic heavy metals, such as As, Hg and Pb, from an aqueous solution. However, the method is not limited to toxic heavy metals and may be used to remove other dissolved heavy metals from an aqueous solution.

The dissolved heavy metal may be present in the aqueous solution as the metal cation, a hydrated form of the metal cation or an oxyanion of the metal. As used herein, the term "heavy metal ion" refers to a cation of a heavy metal, a cation of a heavy metal in hydrated form or an oxyanion of a heavy metal. Similarly, as used herein, the term "arsenic ion" refers to a cation of arsenic, a hydrated form of a cation of arsenic or an oxyanion of As. For example, in aerated aqueous solutions having a pH of about 8 to 9 arsenic ions are generally present as As (V) oxyanions (e.g. $H_2AsO_4^-$, $HAsO_4^{2-}$ or $AsO_4^{3-}$). The method of the invention can, for example, be used to remove As cations or oxyanions of As from an aqueous solution.

The removal of low levels of arsenic ions from aqueous solutions using cysteine coated silica microparticles has been reported. Several cysteine molecules were required to bind to each arsenic ion species and the capture of arsenic onto cysteine groups bound onto a solid substrate was observed [F. Makavipour, R. M. Pashley, A study of ion adsorption onto surface functionalized silica particles, Chem. Eng. J., 262 (2015) 119-24]. However, this process is non-continuous, and does not remove arsenic ion in contaminated water to the levels stipulated by WHO for drinking water.

The inventors have now developed an alternative method of removing dissolved arsenic, or other dissolved heavy metals, from an aqueous solution which uses a fluid source of cysteine groups to adsorb the heavy metal.

Adsorptive bubble separation techniques have been used to remove various substances from wastewaters. There are several separation techniques employing adsorption on gas bubbles; these methods are divided into two categories, foam separation and non-foaming adsorptive bubble separation techniques. Foam separation techniques can be subdivided into foam fractionation and flotation methods. Flotation methods include ore flotation, macro flotation, colloidal flotation, ion flotation and precipitate flotation. Precipitate flotation requires precipitation of the metal species in preparation for subsequent flotation. Adsorbing colloid flotation involves removal of metal ions by adsorption onto carrier flocs such as those produced by $Fe(OH)_3$ and $Al(OH)_3$ salts.

Ion flotation is a separation technology for recovering and removing metal ions from aqueous solutions based on the association between the ions and a surfactant species. The ion and surfactant are adsorbed onto the surface of rising bubbles and carried into a foam on the surface which is then removed from the solution.

The method of the present invention provides a novel flotation technique for removing dissolved heavy metals from an aqueous solution.

In a first aspect, the present invention provides a method for removing a dissolved heavy metal (e.g. arsenic, mercury or lead) from an aqueous solution comprising the dissolved heavy metal. The method comprises dissolving in the aqueous solution a foaming agent of formula (I):

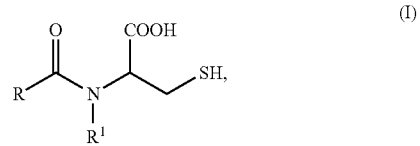

or a salt thereof. In formula (I), R represents a hydrophobic group, and $R^1$ represents H or $CH_3$.

As used herein, a "foaming agent" is a material which facilitates the formation of foam from an aqueous solution. When gas is passed through the aqueous solution, typically as small bubbles, the foaming agent facilitates the formation of a foam. The "foaming agent" used in the method of the present invention is a compound of formula (I) or a salt thereof. The foaming agent of formula (I) or salt thereof is a cysteine-surfactant (i.e. a surfactant containing a cysteine group), which has foaming properties in an aqueous solution.

Surfactants are compounds that lower the surface tension (or interfacial tension) between two liquids or between a liquid and a solid. Surfactants are usually organic compounds that are amphiphilic, meaning they contain both a hydrophobic group (their tail) and a hydrophilic group (their head). Therefore, a surfactant contains both a water-insoluble (or oil-soluble) component and a water-soluble component (typically a charged group). Surfactants will diffuse in water and adsorb at interfaces between air and water or at the interface between oil and water, in the case where water is mixed with oil. The water-insoluble hydrophobic group may extend out of the bulk water phase, into the air or into the oil phase, while the water-soluble head group remains in the water phase.

In the bulk aqueous phase, surfactants form aggregates, such as micelles, at concentrations above the critical micelle concentration (CMC), where the hydrophobic tails form the core of the aggregate and the hydrophilic heads are in contact with the surrounding liquid. The CMC of a surfactant in an aqueous solution can be determined by a person skilled in the art using techniques known in the art. For example, the CMC of a surfactant can be determined by measuring changes in the conductance or surface tension of the solution at different concentrations of the surfactant.

The compound of formula (I) or salt thereof provides a fluid source of cysteine, in the form of a surfactant comprising a (hydrophobic) group with a cysteine head-group. The compound of formula (I) has the following chemical structure:

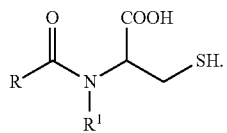

As a person skilled in the art will appreciate, the compound of formula (I) may be provided in the form of a salt, in which the $H^+$ ion on the $COO^-H^+$ group (i.e. H of the COOH group) is replaced by another cation (e.g. $Na^+$, $K^+$, Li or $Cs^+$).

In the compound of formula (I), R represents a hydrophobic group, and $R^1$ represents a hydrogen or methyl group.

Preferably the compound of formula (I) or salt thereof has a solubility of greater than 0.0001 M in water, e.g. greater than 0.001 M or 0.01 M, at 25° C. For compounds of formula (I) or salts thereof having a solubility in water below 0.0001 M, only low concentrations can be dissolved in an aqueous solution and this may limit the rate at which the dissolved heavy metal can be removed from the aqueous solution.

Preferably, the CMC of the compound of formula (I) or salt thereof in the aqueous solution is greater than 0.0001 M, e.g. greater than 0.001 M or 0.01 M. In some embodiments, the CMC of the compound of formula (I) or salt thereof in the aqueous solution is from 0.0001 M to 1 M. The method of the present invention can advantageously be used to remove dissolved heavy metals from dilute aqueous solutions comprising less than 10 ppm of the heavy metal ions and containing low levels of other dissolved species. In such dilute aqueous solutions, the CMC of the compound of formula (I) or salt thereof in the aqueous solution will be similar to the CMC of the compound of formula (I) or salt thereof in water. In some embodiments, the CMC of the compound of formula (I) or salt thereof in water at 25° C. and atmospheric pressure is greater than 0.0001 M, e.g. greater than 0.001 M or 0.01 M. In some embodiments, the CMC of the compound of formula (I) or salt thereof in water at 25° C. and atmospheric pressure is from 0.0001 M to 1 M.

In order to remove the dissolved heavy metal from the aqueous solution, the method of the invention further comprises passing a gas through the aqueous solution to form a foam, and separating the foam from the remaining bulk aqueous solution. Accordingly, in a second aspect, the present invention provides a method for removing a dissolved heavy metal from an aqueous solution, the method comprising dissolving in the aqueous solution a foaming agent of formula (I):

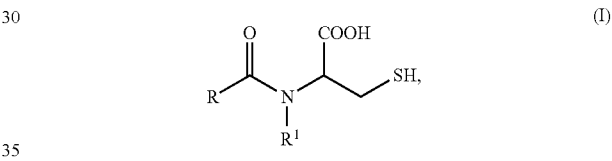

or a salt thereof, wherein R represents a hydrophobic group, and $R^1$ represents a hydrogen or methyl group;
passing a gas through the aqueous solution to form a foam; and
separating the foam from the aqueous solution.

Typically, the gas is passed through the aqueous solution to form a foam by bubbling the gas through the liquid aqueous solution. Typically the gas is introduced into the aqueous solution near the base of the aqueous solution (e.g. near the floor of a vessel holding the aqueous solution) to form bubbles (typically having a diameter in the range of about 1 mm to about 10 mm) which rise through the aqueous solution to form a foam on the upper surface of the aqueous solution. The gas is typically passed through a porous material, for example, a porous glass sinter, to form multiple bubbles of the gas in the aqueous solution.

Without wishing to be bound by theory, the inventors believe that as the bubbles of the gas pass though the aqueous solution, a mono-layer of the compound of formula (I) or salt thereof is formed around each bubble of the gas. The inventors believe that it is the interaction between one or more of the cysteine groups, which extend from the surface of the bubble, with the dissolved heavy metal, which results in the heavy metal being adsorbed from the aqueous solution as the bubble passes through the aqueous solution. In this way, as the gas bubbles pass through the aqueous solution, the dissolved heavy metal becomes adsorbed onto the cysteine groups of the mono-layer of the compound of formula (I) or salt thereof formed around each rising bubble. The bubbles then form a foam comprising the adsorbed heavy metal which can then be separated from the aqueous solution. Continuation of sparging until foaming ceases can be used to remove residual foaming agent from the aqueous solution as the presence of even low levels of the foaming agent causes foaming.

The method of the present invention comprises dissolving a compound of formula (I) or a salt thereof in an aqueous solution comprising a dissolved heavy metal. A reference herein to an "aqueous solution" refers to a solution in which water is the only solvent or is at least 50% (e.g. at least 80%, at least 90%, at least 95%, at least 98%, or at least 99%) by weight of the total solvents in the solution. Accordingly, a reference to "a method for removing a dissolved heavy metal from an aqueous solution" refers to a method for removing a dissolved heavy metal from a solution in which water is the only solvent or is at least 50% by weight of the total solvents in the solution. Preferably, water comprises at least 90%, at least 95%, at least 98%, or at least 99%, by weight of the total solvents in the solution. Furthermore, a reference to "dissolving in the aqueous solution a foaming agent of formula (I) or salt thereof" refers to dissolving a foaming agent of formula (I) or salt thereof in a solution in which water is the only solvent or is at least 50% by weight of the total solvents in the solution. Preferably, water comprises at least 90%, at least 95%, at least 98%, or at least 99%, by weight of the total solvents in the solution.

The inventors have advantageously found that foaming agents of formula (I) and salts thereof can be used to remove a dissolved heavy metal from an aqueous solution. The method of the present invention can be used to treat an aqueous solution, e.g. groundwater, comprising a dissolved heavy metal, or two or more dissolved heavy metals, to remove at least some of the dissolved heavy metal or metals from the aqueous solution. Advantageously, the method of the present invention can be used to remove heavy metal ions from dilute aqueous solutions comprising less than 10 ppm of the heavy metal ions. However, the method of the invention can also be used to remove heavy metal ions from more concentrated solutions of the heavy metal ion. Advantageously, the method of the present invention can, for example, be used to remove sufficient arsenic, mercury and lead ions from contaminated water to produce water having concentrations of these metals below those stipulated by WHO for drinking water. Thus, the method can, for example, be used to treat water contaminated with arsenic, mercury and/or lead ions to remove a sufficient amount of the arsenic, mercury and/or lead ions to afford water having a concentration of arsenic, mercury and lead ions suitable for drinking water.

The aqueous solution may be any aqueous solution comprising one or more dissolved heavy metals. The aqueous solution may, for example, be groundwater or waste water from an industrial process, mining or other human activity, comprising one or more dissolved heavy metals. The aqueous solution may comprise particulates and other ions in addition to the dissolved heavy metal or heavy metals. In some embodiments, the aqueous solution contains less than 1% w/w of particulates. In some embodiments, the aqueous solution contains less than 20 ppm of dissolved ions of any species. Typically, the aqueous solution does not contain large amounts of materials (e.g. insoluble oils, polydimethylsiloxanes and other silicones, certain alcohols, stearates and glycols) which will inhibit the compound of formula (I) from facilitating the formation of foam from the aqueous solution.

The foaming agent is capable of facilitating the formation of a foam from the aqueous solution, that is, facilitating the formation of a foam comprising pockets of a gas encapsulated by the aqueous solution. After the gas is passed through the aqueous solution, typically in the form of small bubbles (e.g. having a diameter of about 1 mm to about 10 mm), bubbles of the gas move to the surface of the aqueous solution to form a foam on the surface. Typically the gas bubbles are allowed to rise to the top of the liquid phase to form a foam layer. The foam layer phase can then be separated from the liquid phase thereby isolating the adsorbed heavy metal from the liquid phase. The foam layer phase can, for example, be separated from the liquid phase using an outlet tube to collect the foam in a waste container. The collected foam comprising the heavy metal may be collapsed prior to disposal, for example, using silicone or ethanol sprays. In some embodiments, the foam may be treated to isolate the heavy metal from the foam.

The method of the present invention may, for example, comprise aeration at a low flow-rate (e.g. 3 L/min through a sinter of about 7 $cm^2$ in area) of an aqueous solution containing the dissolved heavy metal and the cysteine surfactant (i.e. the compound of formula (I) or salt thereof) in a suitable vessel, e.g. a bubble column. In such embodiments, as the aeration is performed, bubbles rise to the surface of the aqueous solution forming a foam on the surface which is then separated from the aqueous solution. Additional volume of an aqueous solution containing the dissolved heavy metal, with or without the cysteine-surfactant, may be introduced into the vessel. The additional aqueous solution introduced into the vessel (the feed solution) may be introduced into the vessel in a manner such that the feed solution is initially contacted with the foam so that some amount of separation of the heavy metal from the feed solution takes place while it is passing through the foam. Alternatively, the feed solution could also be added directly to the aqueous solution below the interface of the aqueous solution and the foam, e.g. just below the foam.

The compound of formula (I) or salt thereof dissolved in the aqueous solution forms a monolayer around the bubbles of the gas. The orientation of the compound of formula (I) or salt thereof around the bubble is such that the hydrophobic group orients towards the gas and the cysteine head-group orients towards the aqueous solution. Bubbles passing through the aqueous solution provide a continuous supply of cysteine coated monolayers, where the surfactants and head-groups will be relatively mobile at room temperature (e.g. at 25° C.). Collisions between the dissolved heavy metal species and the cysteine coated bubbles provide selective and efficient heavy metal capture and removal in a one step water treatment process. In this system, cysteine groups effectively chelate with dissolved heavy metals in the aqueous solution. Without wishing to be bound by theory, the inventors believe that the fluid nature of the adsorbed surfactant layer at a bubble surface, which moves through the aqueous solution, supports an efficient spatial arrangement of groups to chelate with the dissolved heavy metal, because it is expected that several groups of cysteine are required for each heavy metal ion. Once adsorbed, the heavy metal can be effectively removed by the bubbles into a foam on the surface of the aqueous solution.

As shown in the Examples, the inventors have found that the method can, for example, provide a removal rate of arsenic ions of 99.4% in a 5 ppm feed solution, which indicates that this process is capable of reducing 5 ppm arsenic content in solution to lower than the recommended WHO limit (of 0.01 ppm) for drinking water. Similar removal rates have also been obtained for Hg and Pb (see Table 6).

The method of the present invention provides a selective method of removing heavy metal ions, such as arsenic, mercury and lead ions, from an aqueous solution, for example, polluted groundwater, to below the maximum contaminant level (MCL) specified by WHO or the EPA for drinking water, which can be carried out with low energy consumption and small space requirements, which does not require the use of expensive technology, and which can be conducted in a one step process and/or at the point of access to the contaminated water. Furthermore, the foaming agent of formula (I) or salt thereof (a cysteine-surfactant) is more environmentally friendly and biodegradable than cysteine coated silica microparticles used in some prior art processes for removing arsenic from water.

The method of the present invention can be carried out in a batch process or, advantageously, a continuous process. A continuous process can be advantageous as a continuous process is generally more energy and cost efficient for treating large volumes of an aqueous solution than a batch process.

Figure 2:
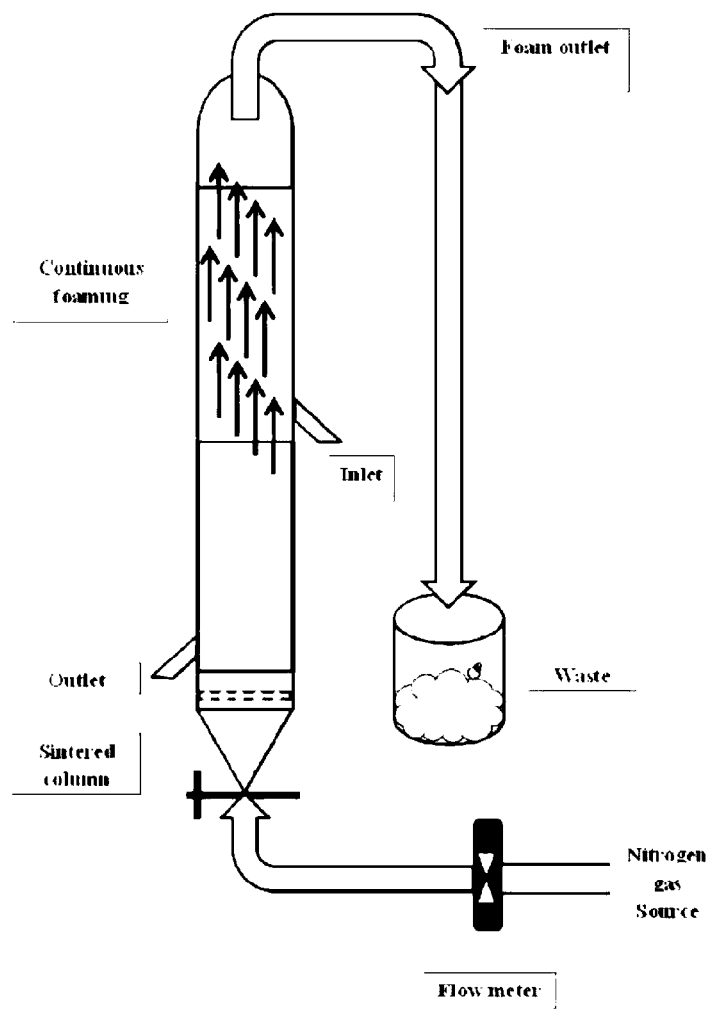
FIG. 2 is a schematic representation of a column apparatus suitable for carrying out the method of the present invention.
Figure 3:
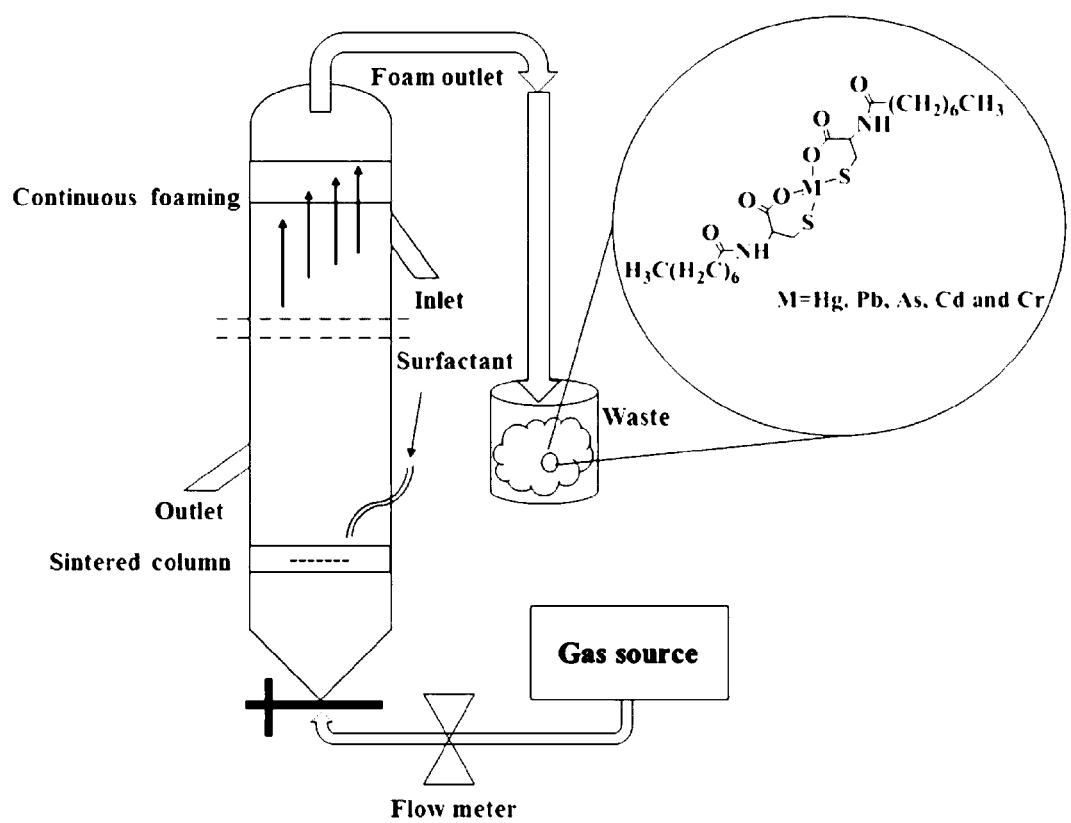
FIG. 3 is a schematic representation of another example of a column apparatus suitable for carrying out the method of the present invention.

FIG. 2 is a schematic diagram of the column apparatus used in the experiments described in the Examples. The same or similar apparatus can, for example, be used to perform the method of the present invention in a batch process or a continuous process. For example, in a batch process, a sample of the aqueous solution may be treated in the column depicted in FIG. 2 and then the treated aqueous solution is removed from the column through the outlet. Following this, a new sample of the aqueous solution and the foaming agent is introduced to the column through the inlet for treatment by the method of the present invention. Similar apparatus can also be used in a continuous process. FIG. 3 depicts one example of suitable apparatus for carrying out the method of the present invention in a continuous process. Using the apparatus depicted in FIG. 3, the aqueous solution (feed solution) is introduced to the bubble column in a continuous flow through the inlet, and the treated aqueous solution removed through the outlet in a continuous flow. A concentrated solution of the foaming agent is introduced in a continuous flow through a separate inlet (labeled "Surfactant" in FIG. 3), positioned near to the sinter of the column. To provide a longer period of contact between the rising bubbles and the aqueous solution, the height of the column, relative to its other dimensions, will typically be greater than that depicted in FIG. 3. The outlet in FIG. 3 is orientated in a downward direction to avoid bubbles rising through the aqueous solution moving though the outlet as the aqueous solution is removed from the column. As a person skilled in the art will appreciate, various other apparatuses are possible for performing the method of the present invention.

In formula (I), R may represent an aliphatic hydrophobic group, for example a linear or branched $C_5$-$C_{10}$ alkyl, e.g. a linear or branched $C_7$-$C_9$ alkyl.

In one embodiment, R represents —$(CH_2)_6CH_3$ and $R_1$ represents H. In this embodiment, the compound of formula (I) has the following structure:

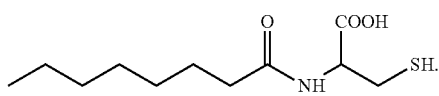 [SMILES: CCCCCCCC(=O)NC(CS)C(=O)O]

This compound can be referred to as "octanoyl-cysteine". This amino acid-based monomeric surfactant can be synthesized by reacting cysteine with octanoyl chloride. Similar methods can be used to prepare other compounds of formula (I).

In one embodiment, R represents —$(CH_2)_8CH_3$ and $R_1$ represents H.

As mentioned previously, the compound of formula (I) may be provided as a salt, where the H atom ($H^+$ ion) of the COOH group is replaced by another cation, for example $Na^+$. For example, the sodium salt of octanoyl-cysteine has the following structure:

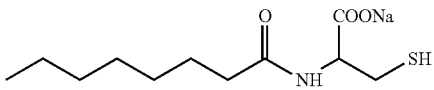

Examples of suitable salts also include salts of K, Li or Cs.

In one embodiment, the foaming agent is a salt of octanoyl-cysteine.

Preferably, the foaming agent, i.e. the compound of formula (I) or a salt thereof, is dissolved in the aqueous solution in an amount up to the critical micelle concentration (CMC), that is, it is preferred that the foaming agent is dissolved in the aqueous solution in an amount to provide a concentration of the foaming agent below the CMC of the foaming agent. This is preferred as, if the concentration of the foaming agent exceeds the CMC, the foaming agent will form aggregates, such as micelles, and some of the heavy metal may become bound with the aggregates rather than the cysteine groups in the mono-layer around the bubbles of the gas passing through the aqueous solution. This may reduce the efficiency of the method of the present invention in removing the heavy metal from the aqueous solution.

In the method of the present invention, the foaming agent, i.e. the compound of formula (I) or salt thereof, is typically dissolved in the aqueous solution in an amount to provide a solution having a concentration of the compound of formula (I) or salt thereof greater than about 0.01 mM, e.g. more than about 0.0001 M, more than about 0.001 M or more than about 0.01 M. In some embodiments, the compound of formula (I) or salt thereof is dissolved in the aqueous solution in an amount to provide a solution having a concentration of the compound of formula (I) or salt thereof in the range of about 0.01 mM to about 0.1 M, about 0.0001 M to about 0.1 M, about 0.0001 M to about 0.02 M or about 0.001 to about 0.02 M. The aqueous solution may optionally be heated to facilitate the dissolution of the compound of formula (I) or salt thereof.

In one embodiment, the compound of formula (I) or salt thereof is dissolved in the aqueous solution in an amount to provide a solution having a concentration of the compound of formula (I) or salt thereof greater than about 0.01 mM. Accordingly, in one embodiment, the present invention provides a method for removing a dissolved heavy metal from an aqueous solution, the method comprising dissolving in the aqueous solution a foaming agent of formula (I):

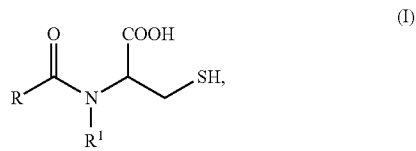

or a salt thereof, wherein R represents a hydrophobic group, and R¹ represents a hydrogen or methyl group;
to form an aqueous solution comprising the foaming agent of formula (I) or salt thereof in an amount greater than about 0.01 mM;
passing a gas through the aqueous solution to form a foam; and separating the foam from the aqueous solution.

In one embodiment, the concentration of the compound of formula (I) or salt thereof in the aqueous solution is about 0.01 M.

In a preferred embodiment of the present invention, the foaming agent of formula (I) or salt thereof has a CMC in the aqueous solution of greater than 0.0001 M, and is dissolved in the aqueous solution in an amount such that the resultant solution has a concentration of the compound of formula (I) or salt thereof greater than about 0.01 mM, e.g. greater than about 0.0001 M. Accordingly, in a preferred embodiment, the present invention provides a method for removing a dissolved heavy metal from an aqueous solution, the method comprising:
a) dissolving in the aqueous solution a foaming agent of formula (I):

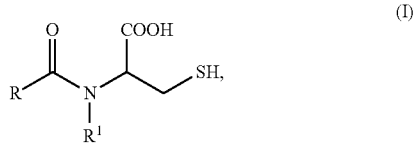

or a salt thereof,
wherein R represents a hydrophobic group, and R¹ represents a hydrogen or methyl group,
and wherein the foaming agent of formula (I) or salt thereof has a CMC in the aqueous solution greater than 0.0001 M and is dissolved in the aqueous solution in an amount to provide a solution having a concentration of the foaming agent of formula (I) or salt thereof greater than about 0.01 mM;
b) passing a gas through the aqueous solution to form a foam; and
c) separating the foam from the aqueous solution.

In an embodiment, the pH of the aqueous solution is in the range of from about 8 to about 9. At this pH range, arsenic ions are present in an aerated aqueous solution as As (V) oxyanions.

The gas may be passed through the aqueous solution in either a continuous or an intermittent manner. Preferably, bubbles of the gas are passed through the aqueous solution in a continuous stream.

The gas may be any gas that is substantially non-reactive with the foaming agent and the aqueous solution. The gas may, for example, be selected from the group consisting of dry air, humidified air, carbon dioxide, nitrogen, oxygen, helium or argon.

The gas may, for example, be introduced into the aqueous solution using a gas inlet having a pressure just above atmospheric pressure, e.g. in the range 1 to 1.5 atm.

In the method of the present invention, the aqueous solution and the gas introduced into the aqueous solution are typically at about room temperature, and typically the method is performed at atmospheric pressure. However, as a person skilled in the art will appreciate, the method of the present invention can be carried out at other temperatures and pressures.

EXAMPLES

The present invention is further described below by reference to the following non-limiting examples.
Materials and Method
1.1 Materials
L-cysteine (97%), cystine, octanoyl chloride, dodecanoyl chloride, octyl isocyanate, octyl bromide, sodium octanoate 99%, octyl amine 99%, tert-dodecylmercaptan 98.5%, myristyltrimethyl ammonium bromide (C14-Tab), thymolphthalein, arsenic standard solution (1000 ppm), sodium hydroxide, acetone, ethanol, methanol, hexane were all purchased from Sigma-Aldrich, Australia. All reagents were used without further purification. Milli-Q water was used in all stages of these experiments.

Various surfactants comprising a cysteine or cystine group were synthesized and their properties investigated as described below.

Note that 'S—' refers to single chain and 'D-' double chain compounds.
1.2. Synthesis of Sodium Octanoyl Cysteine/Cystine Surfactant
1.2.1 Single Chain Surfactant (S-Octanoyl-Cysteine):
0.06 mol of NaOH and 0.06 mol of L-cysteine were dissolved into 20 ml water at room temperature, followed by adding a mixture of 0.075 mol octanoyl chloride and 20 ml acetone, dropwise, while stirring at 10-15° C. The pH of the solution was kept at about 8-10 by adding about 2 ml of sodium hydroxide solution (10%). 50 ml acetone was added to the resulting mixture and then the precipitate was filtered and washed with acetone. The precipitate was then recrystallized 2 times in a mixture of acetone:water (V:V, 50:50). A scheme for the synthesis of the single chain octanoyl-cysteine is shown in FIG. 1.
1.2.2 Double Chain Surfactant (D-Octanoyl-Cystine):
0.04 mol of NaOH and 0.02 mol of L-cystine were dissolved into 100 ml of acetone and water (2:1) mixture at room temperature, followed by adding a mixture of 0.05 mol octanoyl chloride, dropwise, while stirring at 10-15° C. The pH of the solution was kept at about 8-10 by adding sodium hydroxide solution (10%). The mixture was stirred for half an hour, and then the precipitate was filtered and washed with acetone. The precipitate was then recrystallized 2 times in a mixture of acetone:water (V:V, 50:50).
1.3. Synthesis of Sodium Dodecanoyl Cysteine/Cystine Surfactant
1.3.1 Single Chain Surfactant (S-Dodecanoyl-Cysteine)
0.02 mol of NaOH and 0.02 mol of L-cysteine were dissolved into 100 ml of acetone and water (2:1) mixture at room temperature, followed by adding a mixture of 0.025 mol dodecanoyl (lauroyl) chloride, dropwise, while stirring at 10-15° C. The pH of the solution was kept at about 8-10 by adding sodium hydroxide solution (10%). The mixture was stirred for half an hour, and then the precipitate was filtered and washed with acetone. The precipitate was then recrystallized 2 times in a mixture of ethanol:water (V:V, 95:5).
1.3.2 Double Chain Surfactant (D-Dodecanoyl-Cystine)
0.04 mol of NaOH and 0.02 mol of L-cystine were dissolved into 100 ml of acetone and water (2:1) mixture at room temperature, followed by adding a mixture of 0.05 mol dodecanoyl (lauroyl) chloride, dropwise, while stirring at 10-15° C. The pH of the solution was kept at about 8-10 by adding sodium hydroxide solution (10%). The mixture was stirred for half an hour, and then the precipitate was filtered and washed with acetone. The precipitate was then recrystallized 2 times in a mixture of ethanol:water (V:V, 95:5) (H.

Fan, F. Han, Z. Liu, L. Qin, Z. Li, D. Liang, F. Ke, J. Huang, H. Fu, Active control of surface properties and aggregation behavior in amino acid-based Gemini surfactant systems, *J. Colloid Interface Sci.*, 321 (2008) 227-34).

1.4. Synthesis of Sodium Octyl Cysteine Surfactant 1.4.1 Single Chain Surfactant (S-Octyl-Cysteine)

0.04 mol of NaOH and 0.04 mol of L-cysteine were dissolved into 40 ml of methanol at 30° C., followed by adding a small amount of thymolphthalein. 0.045 mol of octyl bromide was added to this mixture and refluxed for 5 hours under alkaline conditions by adding NaOH (such that, there was no change in blue colour of the solution in the presence of thymolphthalein). The solution was left overnight. After solvent evaporation under reduced pressure, the residue was dissolved in water and its pH was decreased to about 5 by adding HCl 0.1M. The precipitate formed was then filtered and washed with acetone, hexane and methanol and recrystallized 2 times in methanol (T. Yoshimura, et. al, Adsorption and aggregation properties of amino acid-based N-alkyl cysteine monomeric and -dialkyl cystine gemini surfactants, *J. Colloid Interface Sci.*, 308 (2007) 466-73).

1.5. Synthesis of Sodium Octyl Isocyanate Cysteine/Cystine Surfactant 1.5.1 Single Chain Surfactant (S-Octyl Isocyanate-Cysteine)

0.02 mol of NaOH and 0.02 mol of L-cysteine were dissolved into 20 ml water at room temperature. After 1 hour stirring, a mixture of 0.02 mol octyl isocyanate and 20 ml acetone was added to it, dropwise. The solution was then left overnight and the precipitate which was produced was washed with acetone and recrystallized 2 times in a mixture of acetone:water (V:V, 90:10) (C. M. C. Faustino et al, New Urea-Based Surfactants Derived from α,ω-Amino Acids, *The Journal of Physical Chemistry B*, 113 (2009) 977-82).

1.5.2 Double Chain Surfactant (D-Octyl Isocyanate-Cystine)

0.04 mol of NaOH and 0.01 mol of L-cystine were dissolved into 20 ml water at room temperature. After 1 hour stirring, a mixture of 0.02 mol octyl isocyanate and 20 ml acetone was added to it, dropwise. The solution was then left overnight and the precipitate produced was filtered and washed with acetone and recrystallized 2 times in a mixture of acetone:water (V:V, 90:10) (C. M. C. Faustino et al, Dimeric and monomeric surfactants derived from sulfur-containing amino acids, *J. Colloid Interface Sci.*, 351 (2010) 472-77).

1.6. Product Characterisation

The octanoyl-cysteine product was characterized by $^1$H NMR spectroscopy, FT-IR spectroscopy, elemental analysis and melting point determination. $^1$H spectroscopy was measured in $D_2O$ on an Oxford NMR 400 spectrometer operating at 400 MHz.

IR spectra were obtained for samples contained in KBr pellets, using a Shimadzu IRPrestige-21 Spectrophotometer.

Elemental analysis for $C_{11}H_{21}NO_3S$ was carried out using an Elemental Analyser, Model PE2400 CHNS/O (PerkinElmer, Shelton, Conn., USA).

An ICP-MS (Perkin Elmer, NexION 300D with Universal cell technology) was used to determine the arsenic, mercury and lead solution concentrations.

Melting points for octanoyl-cysteine samples were measured using an Electrothermal IA9100 melting apparatus.

The As(V)/As(III) speciation measurements were carried out using a PE 200 Series HPLC, using a PRPX 100 Column, attached to a PE DRC-e (Dynamic Reaction Cell-e) ICPMS. 20 milli molar ammonium phosphate buffer was used as carrier solution at 1.5 ml/min with a matched Meinhart nebuliser and baffled spray chamber. The plasma conditions used were: 1500 W RF, at a gas flow rate of 0.88 ml/min.

A foaming test was performed by dissolving the test compound in water at a concentration of approximately one tenth of the CMC of the test compound. The solution was then placed in a stoppered vessel with air and shaken and a visual observation made as to whether a stable foam had been formed. If the shaken solution formed a stable foam, the test compound was considered to have passed the foaming test.

1.7 Flotation Method 1.7.1 Surfactants' Properties Comparison

The synthesized surfactants were compared to each other with respect to their water solubility, conductivity, critical micelle concentration and foaming ability to determine basic suitability for the ion flotation process.

1.7.2 Flotation System

In a typical experiment, 0.01 M of the single chain octanoyl-cysteine surfactant was dissolved (with stirring and heating to not more than 65° C.) in a solution of arsenic ($HAsO_4^{2-}$) 5 ppm containing NaOH 0.1 M (to keep the pH at about 8), which was then made up to 100 ml using Milli-Q water.

The solution was then poured into a column of 30 cm height and 3 cm diameter, while a 3 L/min flow of nitrogen gas was passing through it. Two samples were taken after 30, 60 and 90 minutes and the arsenic concentration of each sample was determined by ICP-MS. The upper outlet foam was also collected in a waste container using an outlet tube. A schematic diagram of the column apparatus is shown in FIG. 2.

0.001 M of the double chain octanoyl cystine surfactant was used in the same process with an arsenic 5 ppm solution.

0.001 M single chain octyl-cysteine surfactant was also studied over the range 0.5 to 5 ppm arsenic solutions.

A mixture of sodium octanoate 0.001M, tert-dodecyl mercaptan 0.001M, octylamine 0.001M and also tert-dodecyl mercaptan 0.001M and $C_{14}$-Tab 0.001M were also used in the flotation column for evaluation of arsenic adsorption.

Results

Figure 4:
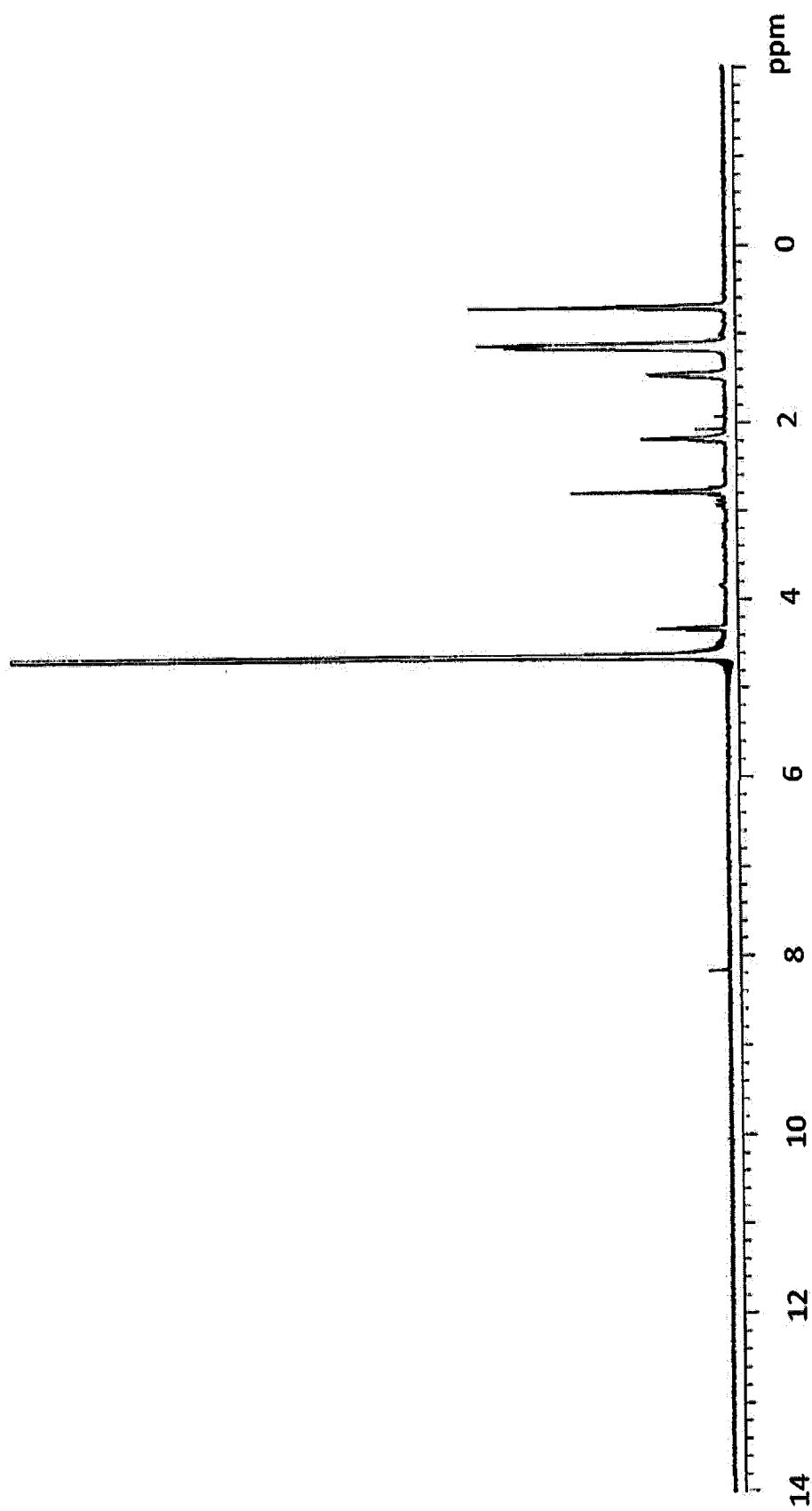
FIG. 4 shows a typical 1H NMR spectra obtained for samples of double re-crystallized octanoyl-cysteine.

1H NMR spectra was obtained for samples of double recrystallised octanoyl-cysteine and a typical result is given in FIG. 4. The spectra showed a sharp peak of HDO at 4.70 ppm 1H NMR: δ (ppm)=4.33 (t, 1H, CHCOONa), 2.80 (t, 1H, SCH2), 2.18 (m, 2H, COCH2), 1.47 (m, 2H, COCH2CH2), 1.30 (d, 8H, (CH2)4)), 0.71 (t, 3H, CH3). This is consistent with the structure of formula (I) where R is —$(CH_2)_6CH_3$ and $R^1$ is H.

Figure 5:
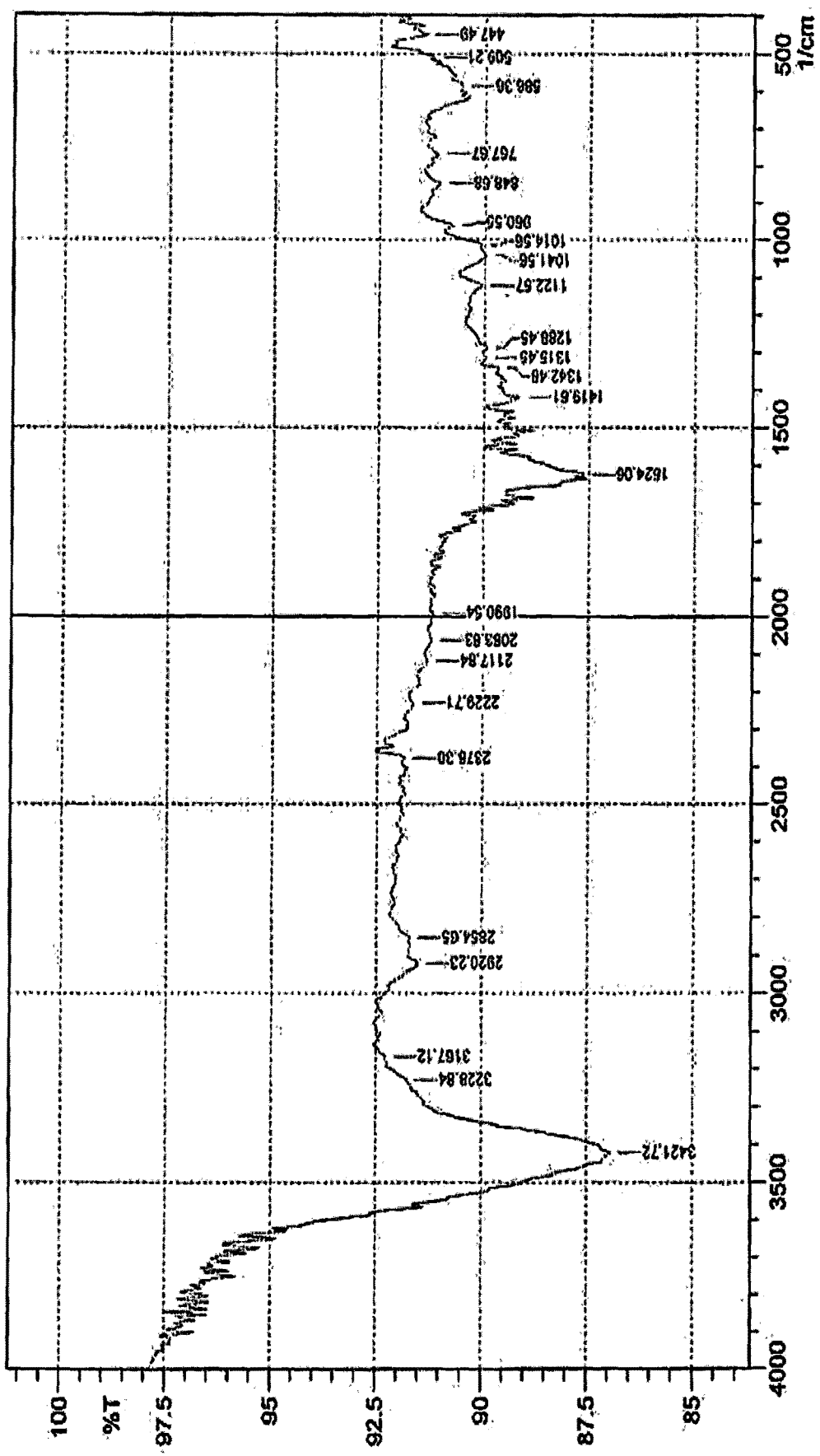
FIG. 5 shows a FT-IR spectra for samples of the double re-crystallized octanoyl-cysteine as shown in FIG. 4.

FT-IR spectra was obtained for samples of double recrystallised octanoyl-cysteine, as shown in FIG. 5 which gave, ($\upsilon_{max}$, cm$^{-1}$): 3421.72 (NH), 2920.23, 2854.65 (CH), 1624.06 (CO), 1504.48 ($\upsilon_{ass}$ CO2-), 1419.61 ($\upsilon_s$ CO2-). This spectral analysis confirms the presence of NH, COO, CO and CH groups in the samples.

The elemental analysis for samples of double recrystallised octanoyl-cysteine, $C_{11}H_{21}NO_3S$, is: C, 53.41; H, 8.56; N, 5.66; S, 12.96 and detailed results obtained for each stage of purification are shown in Table 1. After two recrystallizations the compound gave an almost exact match with the expected elemental analysis.

TABLE 1

Elemental Analysis of the synthesised single chain octanoyl-cysteine samples used in these studies.

| Sample | % C | % H | % N | % S |
|---|---|---|---|---|
| Theory | 53.41 | 8.56 | 5.66 | 12.96 |
| Raw | 11.65 | 1.64 | 1.26 | 2.88 |
| 1 time recrystallized | 47.52 | 7.80 | 4.95 | 11.01 |
| 2 times recrystallized | 53.58 | 9.04 | 5.56 | 12.91 |

A melting point of 127° C. was observed for samples of double recrystallized octanoyl-cysteine, which is close to the expected literature value of 131-133° C. (P. Heitmann, A Model for Sulfhydryl Groups in Proteins. Hydrophobic Interactions of the Cysteine Side Chain in Micelles, *Eur. J. Biochem.*, 3 (1968) 346-50).

The results obtained for the As analysis using ICP-MS of various flotation samples from 100 ml solutions initially containing 5 ppm arsenic, using the single chain octanoyl cysteine ($C_{11}H_{21}NO_3S$) surfactant are shown in Table 2.

TABLE 2

Flotation of 100 ml of 5 ppm arsenic solution using single chain octanoyl cysteine ($C_{11}H_{21}NO_3S$); The Relative Standard Deviation (RSD) for the measurements are also reported. The gases used are also noted.

| Sample ID | As (mg/L) after 30 min (RSD %) | As (mg/L) after 60 min (RSD %) | As (mg/L) after 90 min (RSD %) | Adsorption (%) |
|---|---|---|---|---|
| Test 1 (raw) | 0.36 (7.82) | 0.31 (6.03) | 0.32 (6.11) | 93.8 ($N_2$) |
| Test 2 (raw) | 1.50 (1.20) | 0.79 (5.81) | 0.59 (6.82) | 88.2 ($N_2$) |
| Test 3 (purified) | 0.068 (1.10) | 0.089 (6.11) | 0.11 (24.46) | 98.6 ($N_2$) |
| Test 4 (purified) | 0.029 (1.10) | 0.032 (10.12) | 0.031 (4.04) | 99.4 ($N_2$) |
| Test 5 (purified) | 0.137 (1.03) | 0.006 (0.61) | 0.006 (0.60) | 99.9 (Air) |

Tests 1 and 2, which were run using raw, unpurified product showed an average of 91.00% removal of the 5 ppm feeding solution in the column after 90 minutes while tests 3 and 4 which were done using purified (2 times recrystallized) product of the single chain octanoyl-cysteine showed an average removal of 99.00% after 30 minutes. This indicates that by purification not only the efficiency of removing arsenic from water increases, but also this removal occurred over a shorter time i.e. in a period of 30 minutes rather than 90 minutes.

Figure 6:
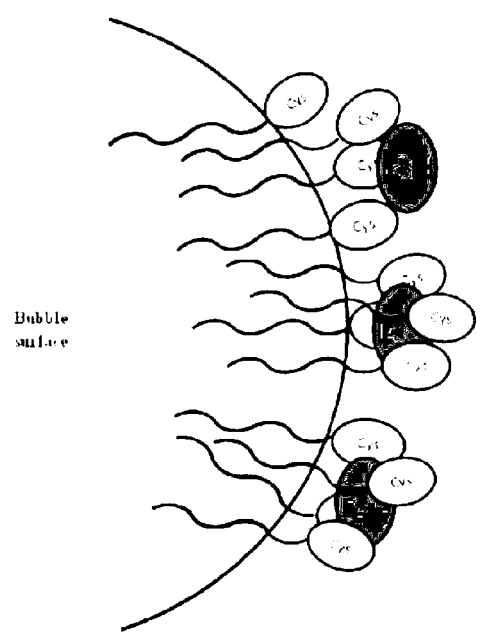
FIG. 6 is a schematic diagram of surfactants of formula (I) or salts thereof attaching to a bubble surface while binding to arsenic species.

A schematic diagram of the process of the compounds of formula (I) or salts thereof, i.e. the cysteine-surfactant, attaching to a bubble surface while binding to arsenic species is shown in FIG. 6.

Column solution samples after 30 minutes, and the solution remaining inside the column after 90 minutes, were sent for arsenic speciation determination analysis. It appears that after about half an hour the maximum adsorption of arsenic was obtained because no further foam was collected at the top of the column. At the beginning of the process the level of bubbling solution plus foam was about 30 cm, while after half an hour this level went down to about 15 cm, so that the soap bubbles bursting on top of the column solution released any adsorbed arsenic back into the solution, hence preventing any further arsenic removal.

By comparison, the double chain octanoyl-cystine surfactant showed almost no (3%) arsenic removal after 30 minutes (see Table 3), even though this surfactant produced significant foaming and foam carryover for the first 30 minutes of the flotation process. This may be because the arsenic ions can only adsorb onto cysteine not cystine.

TABLE 3

Results of flotation system for different amino acid-based surfactants and mixtures of cysteine functional groups in 100 ml of arsenic solution.

| No. | Compound/M | As (mg/L) after 30 min (RSD %) | As (mg/L) after 60 min (RSD %) | As (mg/L) after 90 min (RSD %) | Adsorption after 30 min (%) |
|---|---|---|---|---|---|
| 1 | D-octanoyl cystine/0.001 | 4.85 (0.33) | 5.15 (1.70) | 5.30 (8.43) | 3 |
| 2 | S-octyl cysteine/0.001 | 5.10 (1.25) | 5.24 (1.10) | 5.31 (0.84) | 0 |
| 3 | D-dodecanoyl cystine/$0.01 \times 10^{-3}$ | 5.55 (2.04) | 5.74 (1.60) | 6.12 (1.85) | 0 |
| 4 | Mercaptan and $C_{14}$ Tab/0.001 each | 4.28 (3.84) | 4.36 (1.46) | 4.29 (0.72) | 14.4 |
| 5 | Mixture of 3 functional groups/0.001 each | 1.03 (3.87) | — | — | 0 |

*No. 1, 2, 3, 4 used in 5 ppm arsenic solutions and No. 5 in 1 ppm arsenic solution.

As can be seen in Table 3, the mixture of sodium octanoate, tert-dodecyl mercaptan and octylamine, used as a model of the three functional groups on cysteine, did not show any arsenic adsorption after 30 minutes, even though there was significant foaming and foam carryover. By comparison, the mixture of tert-dodecyl mercaptan and $C_{14}$-Tab showed modest, 14.0% adsorption of arsenic from 5 ppm solutions, after 30 mins, with significant foaming and carryover in that time. This indicates that the thiol group has a significant role in arsenic adsorption in cysteine, as arsenic cannot be adsorbed onto the quaternary ammonium groups. The quat surfactant was added to produce foaming, as the mercaptan alone did not foam. These results suggest that cysteine has a specific activity for arsenic adsorption. The single chain octyl-cysteine surfactant showed no arsenic adsorption (0%), and it is likely that this product failed the adsorption process because it did not produce sufficient foam in the flotation system. Table 4 gives a summary of a number of synthesized surfactants that were tested in the flotation process. In addition, they were tested for use as collectors in adsorbing arsenic in the ion flotation system. The most important parameters were solubility, CMC and foaming level.

TABLE 4

Physical properties and As removal ability of several of the potential cysteine/cystine surfactants studied. (NT means not tested.)

| | Compound | Molecular formula | Solubility in water up to minimum 0.01M | Foaming test | CMC in water (M) | Arsenic removal after 90 minutes |
|---|---|---|---|---|---|---|
| 1 | S-octanoyl cysteine | $C_{11}H_{21}NO_3S$ | Yes | Passed | $0.12*^a$ | 99.4% |
| 2 | D-octanoyl cystine | $C_{22}H_{40}N_2O_6S_2$ | Yes | Passed | 0.017 | 3% |
| 3 | S-octyl cysteine | $C_{11}H_{23}NO_2S$ | Yes | Failed | $0.006*^b$ | 0% |
| 4 | S-octyl isocyanate cysteine | $C_{12}H_{24}N_2O_3S$ | No | Failed | $0.034*^c$ | NT |
| 5 | D-octyl isocyanate cystine | $C_{24}H_{46}N_4O_6S_2$ | No | Failed | $0.008*^c$ | NT |
| 6 | S-dodecanoyl cysteine | $C_{15}H_{29}NO_3S$ | No (0.3 mM) | Passed | $0.02 \times 10^{-3}*^d$ | NT |
| 7 | D-dodecanoyl-cystine | $C_{30}H_{56}N_2O_6S_2$ | No (0.2 mM) | Passed | $0.01 \times 10^{-3}$ | 0% |

*[a] P. Heitmann, A Model for Sulfhydryl Groups in Proteins. Hydrophobic Interactions of the Cysteine Side Chain in Micelles, Eur. J. Biochem., 3 (1968) 346-50.
*[b] B. T. Yoshimura, A. Sakato, K. Tsuchiya, T. Ohkubo, H. Sakai, M. Abe, K. Esumi, Adsorption and aggregation properties of amino acid-based N-alkyl cysteine monomeric and -dialkyl cystine gemini surfactants, J. Colloid Interface Sci., 308 (2007) 466-73.
*[c] C. M. C. Faustino, A. R. T. Calado, L. Garcia-Rio, Mixed micelle formation between amino acid-based surfactants and phospholipids, J. Colloid Interface Sci., 359 (2011) 493-98.
*[d] H. Fan, F. Han, Z. Liu, L. Qin, Z. Li, D. Liang, F. Ke, J. Huang, H. Fu, Active control of surface properties and aggregation behavior in amino acid-based Gemini surfactant systems, J. Colloid Interface Sci., 321 (2008) 227-34.

The octanoyl surfactants (both single, S, and double chain, D), showed good foaming but only the single chain was successful, producing 99.00% arsenic removal, whereas the double chain only gave 3.00% removal of arsenic. The single chain octyl based cysteine surfactant failed the foaming test but was still used in the flotation cell due to its good solubility and high CMC. However, no arsenic removal was observed. Single chain-octyl isocyanate cysteine and double chain-octyl isocyanate cystine had acceptably high CMC values, but produced no foaming in solution and so were not used in the flotation experiments. Single chain-dodecanoyl cysteine and double chain-dodecanoyl cystine had low CMC values and low solubility in water; and even though they had good foaming character in a flotation cell the solubility and CMC were too low for them to efficiently remove As from a 5 ppm As solution.

Mercaptan and $C_{14}$ TAB mixtures and mixtures of the 3 functional groups also passed the foaming test and so were used in flotation experiments. The results obtained (see Table 3) showed that about 14.4% and 0% of arsenic was removed, after 30 minutes, respectively.

TABLE 5

Speciation outcome for the ion flotation of arsenic solution (5320.6 µg/L) in 0.01M octanoyl-cysteine surfactant solution.

| Sample | Total conc. µg/L | As(III) µg/L | As(V) µg/L | Total As(V) reduced to As(III) | Total As removal |
|---|---|---|---|---|---|
| As in the waste collector (after 30 mins.) | 5287.4 | 5259.4 | 27.9 | 99.47% | 99.38% |
| As remaining in the flotation cell (after 90 mins) | 33.2 | 6.2 | 27.1 | 99.49% | 99.38% |

As it can be seen in Table 5, after 30 minutes of ion flotation using the single chain octanoyl-cysteine surfactant, about 99.47% of As (V) in the feed had been reduced to As (III) by the cysteine-based surfactant and removed from the initial solution, which is consistent with results obtained by ICP-MS. After 90 minutes, samples taken from inside the column showed that only 0.02% of As (V) (which remained in the column, as it was mostly reduced and removed after the first 30 mins of the experiment) was reduced to As (III). However, as there was no overflow of foam, in this case, after 30 minutes the As amount could not change beyond the removal level at 99.38%. This result illustrates that removing arsenic from the column solution occurred with a mutual oxidation/reduction reaction for cysteine to cysteine and As (V) to As (III). Hence, the mechanism of binding could be either first by reduction and then binding or the other way around. Also, whether the binding was just with the sulfhydryl group or a chelating between the carboxyl and sulfhydryl group is not, at this stage, known.

In the above study several double-chain and single-chain cysteine-based surfactants (of carbon length chain of 8 and 12 with different reactants) were synthesized and their properties for using in a bubble/flotation system were investigated. Each of the component groups in cysteine was also studied for their potential application in arsenic ion removal. These were amine, carboxylic acid and thiol groups which, in each case, were studied as potential surfactants in a flotation separation system. In addition, the three components were also tested as a physically combined mixture. The results of this study showed that the octanoyl-cysteine surfactant of formula (I) has suitable characteristics for the efficient removal of low levels of arsenic from drinking water, and was more effective than any of the other surfactants tested.

In similar ion flotation experiments, the removal rates for low levels of mercury and lead ions were also determined using the octanoyl-cysteine surfactant. The experiments were carried out using both air and pure $N_2$ gas. The results obtained are summarized in Table 6.

TABLE 6

Adsorption percentage of 5 ppm As, Hg and Pb ions with 0.01M octanoyl-cysteine surfactant solution using air and pure nitrogen as inlet gases.

| Pollutant | Inlet gas | Adsorption after 30 min (%) | Adsorption after 60 min (%) |
|---|---|---|---|
| As | Air | 72.6 | 99.88 |
| Pb | Air | 92 | 99.1 |
| Pb | $N_2$ | 94.9 | 99.4 |
| Hg | Air | 99.6 | 99.6 |
| Hg | $N_2$ | 99.59 | 99.96 |

These results demonstrate that the foaming agents of formula (I) are effective for removing dissolved heavy metals other than arsenic from aqueous solutions.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method for removing a dissolved heavy metal ion from an aqueous solution, the method comprising dissolving in the aqueous solution a cysteine-surfactant foaming agent consisting essentially of formula (I):

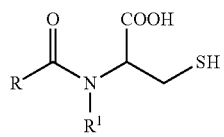

(I)

or a salt thereof,
wherein R represents a linear or branched $C_5$-$C_{10}$ alkyl; and
$R^1$ represents a hydrogen or methyl group;
wherein the method further comprises passing a gas through the aqueous solution to form a foam having bubbles of gas, such that a monolayer of formula (I) forms around the bubbles of gas to capture the heavy metal ion, and separating the foam from the aqueous solution to remove said dissolved heavy metal ion from the aqueous solution.

2. The method according to claim 1, wherein R represents a linear or branched $C_7$-$C_9$ alkyl.

3. A method for removing a dissolved heavy metal ion from an aqueous solution, the method comprising dissolving in the aqueous solution a cysteine-surfactant foaming agent consist essentially of formula (I):

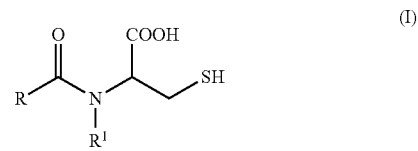

(I)

or a salt thereof,
wherein R represents branched $C_5$-$C_{10}$ alkyl and $R^1$ represents H,
wherein the method further comprises passing a gas through the aqueous solution to form a foam having bubbles of gas, such that a monolayer of formula (I) forms around the bubbles of gas to capture the heavy metal ion, and separating the foam from the aqueous solution to remove said dissolved heavy metal ion from the aqueous solution.

4. The method according to claim 1, wherein the foaming agent of formula (I) or salt thereof has a solubility of greater than 0.0001 M in water.

5. The method according to claim 1, wherein the CMC of the foaming agent of formula (I) or salt thereof in the aqueous solution is greater than 0.0001 M.

6. The method according to claim 1, wherein the foaming agent is in the form of a salt.

7. The method according to claim 6, wherein the salt is a Na, K, Li or Cs salt.

8. The method according to claim 1, wherein the concentration of the foaming agent of formula (I) or salt thereof in the aqueous solution is from about 0.01 mM to about 0.02 M.

9. The method according to claim 8, wherein the concentration is about 0.0001 M to about 0.02 M.

10. The method according to claim 1, wherein the pH of the aqueous solution is in the range of from about 8 to about 9.

11. The method according to claim 1, wherein the heavy metal ion is selected from the group consisting of As, Hg, Pb, Cd, Ni, Co, Cr, Zn and Cu.

12. The method according to claim 1, wherein the dissolved heavy metal ion is arsenic (V), mercury (II) or lead (II).

13. The method according to claim 1, wherein the gas is selected from the group consisting of dry air, humidified air, carbon dioxide, nitrogen, helium, argon and oxygen.

* * * * *

UNITED STATES PATENT AND TRADEMARK OFFICE
CERTIFICATE OF CORRECTION

PATENT NO. : 11,472,723 B2
APPLICATION NO. : 16/343233
DATED : October 18, 2022
INVENTOR(S) : Pashley et al.

Page 1 of 1

It is certified that error appears in the above-identified patent and that said Letters Patent is hereby corrected as shown below:

In the Specification

Column 5, Line 56: Please correct "Li" to read --Li+--

Signed and Sealed this
Seventh Day of February, 2023

Katherine Kelly Vidal
*Director of the United States Patent and Trademark Office*